(12) United States Patent
Iwata

(10) Patent No.: US 12,330,514 B2
(45) Date of Patent: Jun. 17, 2025

(54) IN-VEHICLE SYSTEM AND VEHICLE BRAKE DIAGNOSTIC DEVICE WITH A SINGLE RELAY CONNECTION

(71) Applicant: TOYOTA JIDOSHA KABUSHIKI KAISHA, Toyota (JP)

(72) Inventor: Kenichi Iwata, Osaka (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 398 days.

(21) Appl. No.: 18/153,558

(22) Filed: Jan. 12, 2023

(65) Prior Publication Data
US 2023/0271505 A1    Aug. 31, 2023

(30) Foreign Application Priority Data
Feb. 25, 2022   (JP) .................................. 2022-027769

(51) Int. Cl.
*B60L 3/00*    (2019.01)
(52) U.S. Cl.
CPC .......... *B60L 3/0076* (2013.01); *B60L 3/0046* (2013.01)
(58) Field of Classification Search
None
See application file for complete search history.

(56) References Cited

U.S. PATENT DOCUMENTS

2020/0238832 A1*  7/2020  Nakayama ............ B60R 16/033
2022/0063712 A1   3/2022  Kajisawa et al.

FOREIGN PATENT DOCUMENTS

| JP | 5266892 B2 | 8/2013 |
| JP | 2022-039399 A | 3/2022 |

* cited by examiner

*Primary Examiner* — James J Lee
*Assistant Examiner* — Tawri M McAndrews
(74) *Attorney, Agent, or Firm* — Oliff PLC

(57) ABSTRACT

An in-vehicle system includes a main battery, a sub-battery, a brake system that is connected to the main battery and also is connected to the sub-battery through one semiconductor relay, a diagnostic unit that performs diagnosis of the brake system, and a control unit that controls the sub-battery. The diagnostic unit is configured to perform notification regarding a diagnosis start of the brake system to the control unit, the control unit is configured to perform discharge control of the sub-battery, based on the diagnosis start notified from the diagnostic unit, and is configured to set voltage of a first terminal of the semiconductor relay to which the sub-battery is connected, such that the voltage of the first terminal is higher than voltage of a second terminal of the semiconductor relay to which the brake system is connected.

6 Claims, 2 Drawing Sheets

IN-VEHICLE SYSTEM AND VEHICLE BRAKE DIAGNOSTIC DEVICE WITH A SINGLE RELAY CONNECTION

CROSS-REFERENCE TO RELATED APPLICATION

This application claims priority to Japanese Patent Application No. 2022-027769 filed on Feb. 25, 2022, incorporated herein by reference in its entirety.

BACKGROUND

1. Technical Field

The present disclosure relates to an in-vehicle system installed in a vehicle, and to the vehicle.

2. Description of Related Art

Japanese Patent No. 5266892 discloses an electric power supply system that includes a main battery, a sub-battery, and a load to which electric power is supplied from at least one of the main battery and the sub-battery. In this electric power supply system, in order to realize a stable supply of electric power from the sub-battery to the load, two semiconductor relays are inserted in series between the sub-battery and the load, with rectifying directions of parasitic diodes reversed to each other.

SUMMARY

Using a configuration in which only one semiconductor relay is inserted between the sub-battery and the load, in order to reduce the cost of the electric power supply system, is conceivable. However, when using a configuration including only one semiconductor relay, a path through which current flows is created by a parasitic diode, even though the semiconductor relay is controlled to a cutoff state.

For this reason, in a case in which a load such as a brake system that performs self-diagnosis of whether there is an abnormality, in a state in which the semiconductor relay is cut off, is connected to the sub-battery, for example, there is a risk that current will escape through the parasitic diode during self-diagnosis of the brake system, and accurate diagnosis results will not be obtained.

The present disclosure provides an in-vehicle system and a vehicle, which are capable of obtaining accurate results of self-diagnosis of the brake system in a configuration in which one semiconductor relay is inserted between the sub-battery and the brake system.

A first aspect of the present disclosure provides an in-vehicle system installed in a vehicle. The in-vehicle system includes a main battery, a sub-battery, a brake system that is connected to the main battery, and is connected to the sub-battery through one semiconductor relay, a diagnostic unit that is configured to diagnose presence or absence of an abnormality in the brake system, and a control unit configured to control charging and discharging of the sub-battery. The main battery is configured to supply electric power to the brake system, and the sub-battery is configured to supply electric power to the brake system. The diagnostic unit is configured to perform notification regarding a diagnosis start to the control unit when the diagnostic unit starts diagnosis of the brake system. The control unit is configured to perform discharge control of the sub-battery, based on the diagnosis start notified from the diagnostic unit. The control unit is configured to set voltage of the first terminal of the semiconductor relay to which the sub-battery is connected, such that the voltage of the first terminal is higher than voltage of the second terminal of the semiconductor relay to which the brake system is connected, based on the diagnosis start notified from the diagnostic unit.

In the first aspect, the diagnostic unit may be configured to perform notification regarding a diagnosis end to the control unit when the diagnostic unit ends diagnosis of the brake system, and the control unit may be configured to end the discharge control of the sub-battery, based on the ending of diagnosis notified from the diagnostic unit.

In the first aspect, the diagnostic unit may be configured to perform notification regarding the diagnosis end to the control unit after an ignition of the vehicle is turned on.

In the first aspect, the semiconductor relay may include a parasitic diode that performs rectifying from the second terminal toward the first terminal.

A second aspect of the present disclosure provides a vehicle equipped with an in-vehicle system. The vehicle includes the in-vehicle system. The vehicle system includes a main battery, a sub-battery, a brake system that is connected to the main battery, and is connected to the sub-battery through one semiconductor relay, the main battery being configured to supply electric power to the brake system a control unit that controls charging and discharging of the sub-battery, and an in-vehicle system including the main battery, the sub-battery, the semiconductor relay, the brake system, the diagnostic unit, and the control unit. The main battery is configured to supply electric power to the brake system, and the sub-battery is configured to supply electric power to the brake system. The main battery is configured to supply electric power to the brake system, and the sub-battery is configured to supply electric power to the brake system. The diagnostic unit is configured to perform notification regarding a diagnosis start to the control unit when the diagnostic unit starts diagnosis of the brake system. The control unit is configured to perform discharge control of the sub-battery, based on the diagnosis start notified from the diagnostic unit. The control unit is configured to set voltage of the first terminal of the semiconductor relay to which the sub-battery is connected, such that the voltage of the first terminal is higher than voltage of the second terminal of the semiconductor relay to which the brake system is connected, based on the diagnosis start notified from the diagnostic unit.

A third aspect of the present disclosure provides an in-vehicle system installed in a vehicle. The in-vehicle system includes a main battery, a sub-battery, a brake system that is connected to the main battery, and is connected to the sub-battery through one semiconductor relay, a first processor that diagnoses presence or absence of an abnormality in the brake system, a second processor that controls charging and discharging of the sub-battery, and a converter located between the sub-battery and the semiconductor relay. The main battery is configured to supply electric power to the brake system, and the sub-battery is configured to supply electric power to the brake system. The second processor is configured to issue a command to the converter based on a diagnosis start signal of the brake system from the first processor. The second processor is configured to, upon receiving the diagnosis start signal from the first processor, discharge electric power of the sub-battery to a side of the semiconductor relay using the converter. The second processor is configured to set voltage of the first terminal of the semiconductor relay to which the sub-battery is connected, such that the voltage of the first terminal is higher than voltage of the second terminal of the semiconductor relay to which the brake system is connected, based on the diagnosis start signal based on the diagnosis start signal notified from the first processor.

According to the above first through third aspects of the present disclosure, accurate results of self-diagnosis of the brake system can be obtained in a configuration in which one semiconductor relay is inserted between the sub-battery and the brake system.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

An in-vehicle system of the present disclosure has a configuration in which one semiconductor relay is inserted between a sub-battery and a brake system. In this configuration, when performing self-diagnosis, the brake system notifies a redundant electric power supply system that controls the sub-battery regarding starting of diagnosis processing, and the redundant electric power supply system that has received this notification performs discharging of the sub-battery so that voltage on the sub-battery side of the semiconductor relay is higher than voltage on the brake system side thereof. According to this control, out of the voltages on both ends of the semiconductor relay, the voltage on the sub-battery side is higher than the voltage on the brake system side, and thus current can be suppressed from flowing from the brake system to the redundant electric power supply system via a parasitic diode of the semiconductor relay.

An embodiment of the present disclosure will be described below in detail with reference to the drawings.

Embodiment

Configuration

Figure 1:
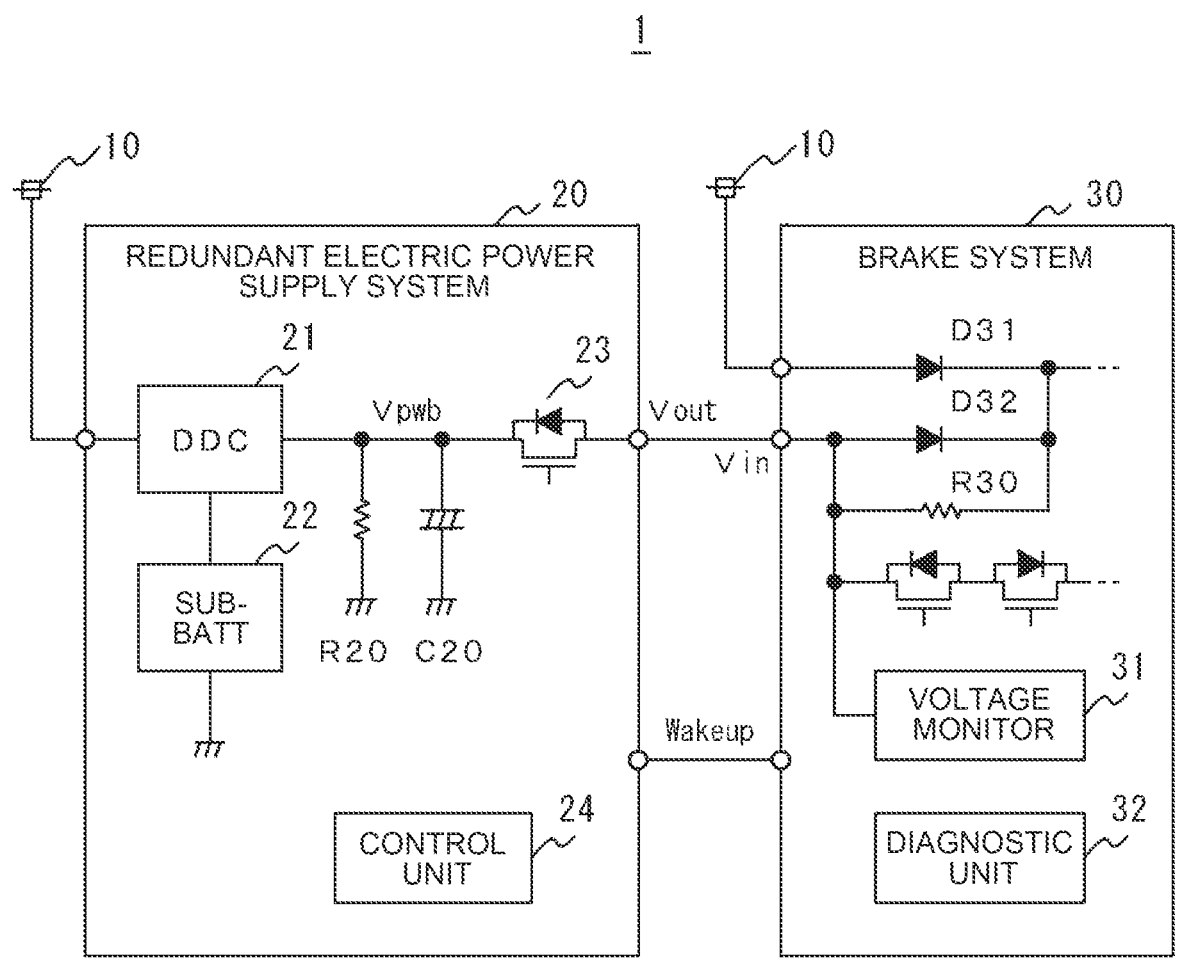
FIG. 1 is a schematic configuration diagram of an in-vehicle system according to an embodiment of the present disclosure.

FIG. 1 is a schematic configuration diagram of an in-vehicle system 1 according to an embodiment of the present disclosure. The in-vehicle system 1 exemplified in FIG. 1 includes a main battery (main BATT) 10, a redundant electric power supply system 20, and a brake system 30.

The in-vehicle system 1 according to the present embodiment can be installed in a vehicle or the like equipped with a load (system, actuator, or the like) that requires a redundant electric power supply configuration. The present embodiment will be described below by way of example of a case of a vehicle equipped with the brake system 30 that requires a redundant electric power supply configuration as a load.

(1) Main Battery

The main battery 10 is, for example, a secondary battery such as a lithium-ion battery, which is configured to be capable of charging and discharging. The main battery 10 is capable of supplying electric power to loads installed in the vehicle, such as the redundant electric power supply system 20 and the brake system 30.

(2) Redundant Electric Power Supply System

The redundant electric power supply system 20 is a system for supplying backup electric power to the brake system 30 when an abnormality occurs in the electric power supply from the main battery 10 to the brake system 30, due to an electric power supply failure or the like. This redundant electric power supply system 20 includes a direct current (DC)-to-DC converter (DDC) 21, a sub-battery (sub-BATT) 22, a semiconductor relay 23, a control unit 24, and so forth.

The DC-to-DC converter 21 is an electric power converter for converting electric power input from the main battery 10 into electric power of a predetermined voltage, and outputting the electric power. The DC-to-DC converter 21 can charge the sub-battery 22 with electric power supplied from the main battery 10, based on instructions (voltage command values or the like) from the control unit 24. Also, the DC-to-DC converter 21 can supply electric power (backup electric power) stored in the sub-battery 22 to the brake system 30 via the semiconductor relay 23, based on instructions from the control unit 24.

The sub-battery 22 is, for example, a secondary battery such as a lithium-ion battery that is configured to be capable of charging and discharging, or a storage element such as a capacitor. The sub-battery 22 is connected to the DC-to-DC converter 21 so as to be capable of charging electric power to the main battery 10, and discharging electric power stored within itself to the brake system 30.

The semiconductor relay 23 is, for example, a relay using a field effect transistor (metal-oxide-semiconductor field-effect transistor (MOSFET)). The semiconductor relay 23 is provided inserted between the DC-to-DC converter 21 and the brake system 30 in a direction such that the parasitic diode (body diode) rectifies from the brake system 30 toward the DC-to-DC converter 21. That is to say, a first terminal of the semiconductor relay 23 on a cathode side of the parasitic diode is connected to the DC-to-DC converter 21, and a second terminal of the semiconductor relay 23 on an anode side of the parasitic diode is connected to the brake system 30. The semiconductor relay 23 switches between electrical conducting and cutoff states, based on instruction from the control unit 24 (or another control unit that is omitted from illustration).

The control unit 24 can control charging and discharging of the sub-battery 22 by instructing the DC-to-DC converter 21 to operate, thereby controlling output voltage Vpwb of the DC-to-DC converter 21. This control is performed based on a wakeup signal (described later) or the like, notified from the brake system 30. Also, the control unit 24 can control switching of the semiconductor relay 23 between the conducting state and the cutoff state. The control unit 24 is made up of, for example, a microcontroller including a processor, memory, an input/output interface, and so forth, and realizes predetermined functions by the processor reading out and executing programs stored in the memory. Note that while a configuration is illustrated in which the control unit 24 is included in the redundant electric power supply system 20, a configuration may be made in which the control unit 24 is outside the redundant electric power supply system 20.

(3) Brake System

The brake system 30 is a control system that operates by the electric power of the main battery 10 or the sub-battery 22, and can generate braking force in the vehicle via a brake actuator (BRK_ACT) of the vehicle, by a brake mechanism that is omitted from illustration. The brake system 30 includes a voltage monitor 31, a diagnostic unit 32, and so forth.

The voltage monitor 31 is a configuration for monitoring voltage Vin appearing at an input terminal, through which the brake system 30 receives supply of backup electric power from the redundant electric power supply system 20, which is output voltage Vout of the redundant electric power supply system 20. This voltage monitor 31 may include a detecting element such as a voltage sensor.

The diagnostic unit 32 is a configuration for performing diagnosis processing for diagnosing the state of the brake system 30. This diagnostic unit 32 diagnoses whether the brake system 30 is operating normally, such as whether the brake actuator will operate, for example. More specifically, the diagnostic unit 32 checks whether the value of the voltage Vin that appears at the input terminal when the brake system 30 is operating normally (in the example in FIG. 1, a voltage value obtained by subtracting dropout voltage due to a diode D31 and dropout voltage due to a resistor R30 from the voltage of the main battery 10) is detected at the voltage monitor 31. Diagnosis processing of the brake system 30 is started when an ignition of the vehicle is turned on (IG-ON), a door of the vehicle is opened, or a brake pedal is depressed, as one example.

When carrying out the diagnosis processing of the brake system 30, the diagnostic unit 32 according to the present embodiment performs notification to the redundant electric power supply system 20 that diagnosis of the brake system 30 will be started. An example of the notification that diagnosis will be started is transmission of a wakeup signal for prompting the redundant electric power supply system 20 to activate. This wakeup signal is preferably transmitted from the brake system 30 to the redundant electric power supply system 20 via a dedicated line (direct line), rather than an in-vehicle network such as a Controller Area Network (CAN) bus or the like.

Note that part or all of this brake system 30 can be configured as an electronic control unit (e.g., BRK_ECU) typically including a processor, memory, input/output interface, and so forth. The electronic control unit realizes the above-described functions by the processor reading out and executing programs stored in the memory. Note that while a configuration is illustrated in which the diagnostic unit 32 is included in the brake system 30, a configuration may be made in which the diagnostic unit 32 is outside of the brake system 30.

Control

Figure 2:
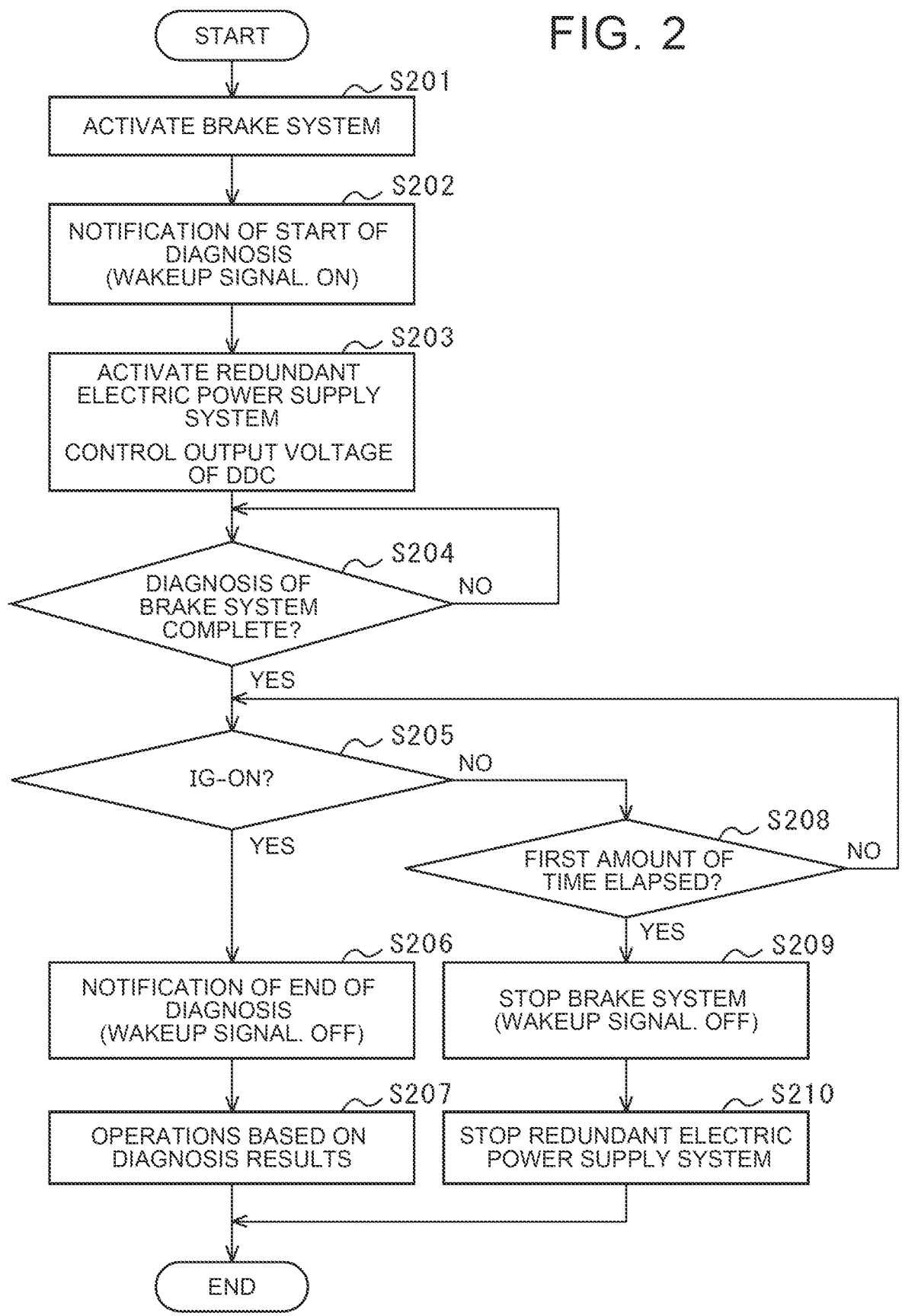
FIG. 2 is a processing flowchart of control that is executed by the in-vehicle system.

Next, control executed by the in-vehicle system 1 according to the present embodiment will be described with reference to FIG. 2. FIG. 2 is a flowchart showing procedures of diagnosis processing of the brake system 30, which is executed by the in-vehicle system 1.

The diagnosis processing of the brake system 30 shown in FIG. 2 is started when a door of the vehicle is opened or the brake pedal is depressed.

Step S201

The in-vehicle system 1 activates the brake system 30. This activation is performed by connecting the main battery 10 to an electric power supply line of the brake system 30 (applying voltage of the main battery 10 to an electric power supply line). When the brake system 30 is activated, the flow advances to step S202.

Step S202

The diagnostic unit 32 of the brake system 30 performs notification to the redundant electric power supply system 20 that diagnosis processing of the brake system 30 will be started (notification of starting diagnosis). The diagnostic unit 32 according to the present embodiment performs notification regarding starting of diagnosis by transmitting, to the redundant electric power supply system 20, a wakeup signal (wakeup signal: ON) for activating the redundant electric power supply system 20. The diagnostic unit 32 also executes diagnosis processing of the brake system 30 in conjunction with the notification of starting of diagnosis. Transmitting the wakeup signal to the redundant electric power supply system 20 through the dedicated line (direct line) enables the brake system 30 and the redundant electric power supply system 20 to be activated almost simultaneously. Upon the redundant electric power supply system 20 being notified of starting of the diagnosis processing of the brake system 30, the flow advances to step S203.

Step S203

The in-vehicle system 1 activates the redundant electric power supply system 20. This activation is performed by causing operations of the DC-to-DC converter 21 of the redundant electric power supply system 20 to start (output of the output voltage Vpwb). After activating the redundant electric power supply system 20, the control unit 24 of the redundant electric power supply system 20 controls the DC-to-DC converter 21 so that the output voltage Vpwb of the DC-to-DC converter 21 is higher than the voltage Vin of the input terminal of the brake system 30. An exemplification of this control is control in which the electric power of the sub-battery 22 (or the electric power of the main battery 10) is discharged to a resistor R20 and a capacitor C20 side while the semiconductor relay 23 is in the cutoff state, to raise the output voltage Vpwb (discharge control). This voltage control can suppress current from flowing from the brake system 30 to the redundant electric power supply system 20 via the parasitic diode of the semiconductor relay 23. When the redundant electric power supply system 20 is activated and the output voltage Vpwb of the DC-to-DC converter 21 is controlled, the flow advances to step S204.

Step S204

The diagnostic unit 32 of the brake system 30 determines whether the diagnosis processing of the brake system 30 has been completed. In this diagnosis processing, at least diagnostic results that the brake system 30 is normal or diagnostic results that the brake system 30 is abnormal are obtained. This diagnosis is performed based on the voltage value detected by the voltage monitor 31, as described above. When the diagnosis processing for the brake system 30 is completed (YES in step S204), the flow advances to step S205. On the other hand, when the diagnosis processing of the brake system 30 is not completed (NO in step S204), completion of the diagnosis processing is determined again in step S204.

Step S205

The in-vehicle system 1 determines whether the ignition of the vehicle is turned on (IG-ON). When the ignition is turned on (IG-ON) (YES in step S205), the flow advances to step S206. On the other hand, when the ignition is not turned on (IG-OFF) (NO in step S205), the flow advances to step S208.

Step S206

The diagnostic unit 32 of the brake system 30 performs notification to the redundant electric power supply system 20 that diagnosis processing of the brake system 30 will be ended (notification of ending diagnosis). The diagnostic unit 32 according to the present embodiment performs notification regarding ending of diagnosis by transmitting, to the redundant electric power supply system 20, a wakeup signal (wakeup signal: OFF) for deactivation (sleep) of the redundant electric power supply system 20. Upon the redundant electric power supply system 20 being notified of ending of the diagnosis processing of the brake system 30, the flow advances to step S207.

Step S207

The in-vehicle system 1 performs operations based on the diagnosis results of the diagnostic unit 32 of the brake system 30. For example, when the diagnosis results indicate that the brake system 30 is normal, the in-vehicle system 1 activates each system of the vehicle to operate normally. On the other hand, when the diagnosis results indicate that the brake system 30 is abnormal, the in-vehicle system 1 activates only a particular system of the vehicle to perform an operation of warning that an abnormality is occurring in the brake system 30 (warning display, audio output, or the like). Upon the operations based on the diagnosis results being performed, the diagnosis processing of the brake system 30 ends.

Step S208

The in-vehicle system 1 determines whether a first amount of time has elapsed since the brake system 30 was activated. This determination is made to avert an increase in electric power consumption due to continuously activating the brake system 30 and the redundant electric power supply system 20 beyond that which is necessary. Accordingly, the first amount of time can be set to a predetermined amount of time that requires less electric power consumption by the system. When determining that the first amount of time has elapsed after activation of the brake system 30 (YES in step S208), the flow advances to step S209. On the other hand, when determining that the first amount of time has not elapsed after activation of the brake system 30 (NO in step S208), the flow advances to step S205.

Step S209

The in-vehicle system 1 stops the brake system 30. This stopping is performed by disconnecting the main battery 10 from the electric power supply line of the brake system 30 (not applying voltage of the main battery 10 to the electric power supply line). When the brake system 30 stops, the flow advances to step S210.

Step S210

The in-vehicle system 1 stops the redundant electric power supply system 20. This stopping is performed by stopping operations of the DC-to-DC converter 21 of the redundant electric power supply system 20 (not outputting the output voltage Vpwb). When the redundant electric power supply system 20 stops, the diagnosis processing of the brake system 30 ends.

Operations and Effects

As described above, according to the in-vehicle system 1 according to an embodiment of the present disclosure, when the brake system 30 performs self-diagnosis in the configuration in which one semiconductor relay 23 is inserted between the sub-battery 22 and the brake system 30, the redundant electric power supply system 20 that controls the sub-battery 22 is notified of starting of diagnosis processing. The redundant electric power supply system 20 that has received the notification of starting of diagnosis processing then controls the DC-to-DC converter 21 to discharge the sub-battery 22, such that the voltage Vpwb at the first terminal of the semiconductor relay 23 on the sub-battery 22 (DC-to-DC converter 21) side is higher than the voltage Vout at the second terminal on the brake system 30 side.

According to this control, out of the voltages on both ends of the semiconductor relay 23, the voltage on the sub-battery 22 (DC-to-DC converter 21) side is higher than the voltage on the brake system 30 side, and thus current can be suppressed from flowing from the brake system 30 to the redundant electric power supply system 20 via the parasitic diode that the semiconductor relay 23 has. Accordingly, accurate results of self-diagnosis of the brake system 30 can be obtained.

Although an embodiment of the technique of the present disclosure has been described above, the present disclosure can be understood as being an in-vehicle system, a control method executed by an in-vehicle system including a processor and memory, a control program for executing the control method, a computer-readable non-transitory storage medium that stores the control program, and a vehicle equipped with the in-vehicle system.

The in-vehicle system according to the present disclosure can be used in vehicles or the like equipped with loads that require redundant electric power supply configurations.

What is claimed is:

1. An in-vehicle system installed in a vehicle, the in-vehicle system comprising:
    a main battery;
    a sub-battery;
    a brake system that is connected to the main battery and is connected to the sub-battery through one semiconductor relay, the main battery being configured to supply electric power to the brake system, and the sub-battery being configured to supply electric power to the brake system;
    a diagnostic unit that is configured to diagnose a presence or absence of an abnormality in the brake system; and
    a control unit configured to control charging and discharging of the sub-battery,
    wherein:
        the diagnostic unit is configured to perform notification regarding a diagnosis start to the control unit when the diagnostic unit starts diagnosis of the brake system,
        the control unit is configured to perform discharge control of the sub-battery, based on the diagnosis start notification from the diagnostic unit, and
        the control unit is configured to set a voltage of a first terminal of the semiconductor relay to which the sub-battery is connected, such that the voltage of the first terminal is higher than a voltage of a second terminal of the semiconductor relay to which the brake system is connected, based on the diagnosis start notification from the diagnostic unit.

2. The in-vehicle system according to claim 1, wherein:
    the diagnostic unit is configured to perform notification regarding a diagnosis end to the control unit when the diagnostic unit ends diagnosis of the brake system; and
    the control unit is configured to end the discharge control of the sub-battery, based on the diagnosis end notification from the diagnostic unit.

3. The in-vehicle system according to claim 2, wherein the diagnostic unit is configured to perform notification regarding the diagnosis end to the control unit after an ignition of the vehicle is turned on.

4. The in-vehicle system according to claim 1, wherein the semiconductor relay includes a parasitic diode that performs rectifying from the second terminal toward the first terminal.

5. A vehicle comprising an in-vehicle system including:
    a main battery;
    a sub-battery;
    a brake system that is connected to the main battery, and is connected to the sub-battery through one semiconductor relay, the main battery being configured to supply electric power to the brake system, and the sub-battery being configured to supply electric power to the brake system;

a diagnostic unit that diagnoses a presence or absence of an abnormality in the brake system; and a control unit that controls charging and discharging of the sub-battery, wherein:
   the diagnostic unit is configured to perform notification regarding a diagnosis start to the control unit when the diagnostic unit starts diagnosis of the brake system,
   the control unit is configured to perform discharge control of the sub-battery, based on the diagnosis start notification from the diagnostic unit, and
   the control unit is configured to set a voltage of a first terminal of the semiconductor relay to which the sub-battery is connected, such that the voltage of the first terminal is higher than a voltage of a second terminal of the semiconductor relay to which the brake system is connected, based on the diagnosis start notification from the diagnostic unit.

6. An in-vehicle system installed in a vehicle, the in-vehicle system comprising:
   a main battery;
   a sub-battery;
   a brake system that is connected to the main battery, and is connected to the sub-battery through one semiconductor relay, the main battery being configured to supply electric power to the brake system, and the sub-battery being configured to supply electric power to the brake system;
   a first processor that diagnoses a presence or absence of an abnormality in the brake system;
   a second processor that controls charging and discharging of the sub-battery; and
   a converter located between the sub-battery and the semiconductor relay, wherein:
   the second processor is configured to issue a command to the converter based on a diagnosis start signal of the brake system from the first processor,
   the second processor is configured to, upon receiving the diagnosis start signal from the first processor, discharge electric power of the sub-battery to a side of the semiconductor relay using the converter, and
   the second processor is configured to set a voltage of a first terminal of the semiconductor relay to which the sub-battery is connected, such that the voltage of the first terminal is higher than a voltage of a second terminal of the semiconductor relay to which the brake system is connected, based on the diagnosis start signal notification from the first processor.

* * * * *